US010078913B2

(12) United States Patent
Rondao Alface et al.

(10) Patent No.: US 10,078,913 B2
(45) Date of Patent: Sep. 18, 2018

(54) CAPTURING AN ENVIRONMENT WITH OBJECTS

(71) Applicant: Alcatel Lucent, Boulogne Billancourt (FR)

(72) Inventors: Patrice Rondao Alface, Antwerp (BE); Vinay Namboodiri, Mumbai (IN); Maarten Aerts, Antwerp (BE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/303,827

(22) PCT Filed: Apr. 9, 2015

(86) PCT No.: PCT/EP2015/057740
§ 371 (c)(1),
(2) Date: Oct. 13, 2016

(87) PCT Pub. No.: WO2015/158604
PCT Pub. Date: Oct. 22, 2015

(65) Prior Publication Data
US 2017/0032569 A1    Feb. 2, 2017

(30) Foreign Application Priority Data

Apr. 15, 2014   (EP) .................................. 14305555

(51) Int. Cl.
*G06T 7/292* (2017.01)
*G06T 17/20* (2006.01)
*G06T 17/00* (2006.01)
*G06T 15/20* (2011.01)
*H04N 13/02* (2006.01)
(Continued)

(52) U.S. Cl.
CPC ................ *G06T 17/20* (2013.01); *G06T 7/13* (2017.01); *G06T 7/246* (2017.01); *G06T 7/292* (2017.01); *G06T 15/205* (2013.01); *G06T 17/00* (2013.01); *H04N 13/0239* (2013.01); *H04N 13/0257* (2013.01); *H04N 13/0282* (2013.01);
(Continued)

(58) Field of Classification Search
CPC ............ G06T 7/11; G06T 7/215; G06T 17/00
See application file for complete search history.

(56) References Cited

U.S. PATENT DOCUMENTS

2003/0198377 A1* 10/2003 Ng .......................... G06K 9/20
                                                            382/154
2004/0105573 A1*  6/2004 Neumann ............... G06T 17/00
                                                            382/103
(Continued)

OTHER PUBLICATIONS

David L. Elsner, "Volumetric Modeling Through Fusion of Multiple Range Images with Confidence Estimate," A Thesis Presented for the Master of Science Degree, The University of Tennessee Knoxville, 147 pages, XP055180309, Dec. 1997.
(Continued)

*Primary Examiner* — Jitesh Patel
(74) *Attorney, Agent, or Firm* — Fay Sharpe, LLP (57) ABSTRACT

Method for capturing an environment with objects, using a 3D camera, wherein the images of the cameras captured at different moments in time are used to generate 3D models, and wherein accuracy values are assigned to segments of the models allowing efficient refining of the models using the accuracy values.

20 Claims, 4 Drawing Sheets

(51) Int. Cl.
  *G06T 7/13* (2017.01)
  *G06T 7/246* (2017.01)
(52) U.S. Cl.
  CPC ............... *G06T 2207/10024* (2013.01); *G06T 2207/10028* (2013.01)

(56) References Cited

U.S. PATENT DOCUMENTS

| | | | | |
|---|---|---|---|---|
| 2010/0302247 | A1* | 12/2010 | Perez | G06K 9/00201 345/440 |
| 2011/0206124 | A1* | 8/2011 | Morphet | H04N 5/145 375/240.16 |
| 2012/0194517 | A1* | 8/2012 | Izadi | G06T 17/00 345/420 |
| 2013/0242051 | A1* | 9/2013 | Balogh | G06T 9/001 348/43 |

OTHER PUBLICATIONS

Ryusuke Sagawa et al., "Incremental Mesh Modeling and Hierarchical Object Recognition using Multiple Range Images," Proceedings of the 2000 IEEE/RSJ International Conference on Intelligent Robots and Systems, pp. 88-95, XP002196167, Oct. 31, 2000.
International Search Report for PCT/EP2015/057740 dated Jun. 29, 2015.
A. van den Hengel, et al., "Interactive 3D Model Completion," P.H.S. Torr, Proceedings of DICTA 2007, Adelaide, Australia, Dec. 3-5, 2007.
K. M. Wurm, "OctoMap: A probabilistic, flexible, and compact 3D map representation for robotic systems," In Proc. of the ICRA 010 workshop, 2010.
G. Sibley, et al., "Adaptive relative bundle adjustment," in Proc. of Robotics: Science and Systems (RSS), 2009.
J. Ryde, et al., "3D mapping with multi-resolution occupied voxel lists," Autonomous Robots, pp. 1-17, 2010.
P. Payeur, et al., "Probabilistic octree modeling of a 3-d dynamic environment," in Proc. of the IEEE Int. Conf. on Robotics & Automation (ICRA), 1997.
J. Fournier, et al., "Mapping and exploration of complex environments using persistent 3D model," in Computer and Robot Vision, 2007. Fourth Canadian Conf. on, 2007, pp. 403-410.
K. Pathak, et al., "3D forward sensor modeling and application to occupancy grid based sensor fusion," in Proc. of the IEEE/RSJ Int. Conf. on Intelligent Robots and Systems (IROS), 2007, pp. 2059-2064.
N. Fairfield, et al., "Real-time SLAM with octree evidence grids for exploration in underwater tunnels," Journal of Field Robotics, 2007.
M. Yguel, et al., "Dense mapping for range sensors: Efficient algorithms and sparce representations," in Proceedings of Robotics: Science and Systems, Jun. 2007.
Y. Manolopoulos, et al., R-Trees: Theory and Applications. Springer, 2006.
B. Kornberger, "Algorithms for 3D Objects using Unions of Balls," Ph.D. thesis, Institute of Theoretical Computer Science, 2010, TU Graz, Austria.
H. Edelsbrunner, et al., "Three-dimensional alpha shapes," in Workshop on Volume Visualization, pp. 75-105, Oct. 1992.
C. L. Bajaj, et al., "Automatic reconstruction of surfaces and scalar fields from 3D scans," in Proceedings of SIGGRAPH '95, Los Angeles, California, Aug. 6-11, 1995, pp. 109-118, AMC Press, Aug. 1995.
M. Slater, et al., "Volume Culling Using a Probabilistic Caching Scheme," Proceedings of the ACM symposium on Virtual reality software and technology, ACM, 1997.
J. Pan, et al., "Probabilistic Collision Detection between Noisy Point Clouds using Robust Classification," in Proceedings of the International Symposium on Robotics Research, 2011.
N. Billen, et al., "Probabilistic Visibility Evaluation for Direct Illumination," Computer Graphics Forum, vol. 32, Issue 4, pp. 39-47, Jul. 2013.

\* cited by examiner

CAPTURING AN ENVIRONMENT WITH OBJECTS

TECHNICAL FIELD

The invention relates to the field of capturing an environment with objects, using image capturing devices. More particularly, the invention relates to the field of 3 dimensional capturing of images.

BACKGROUND

Representation possibilities for 3D images have significantly improved in recent developments. Such improved 3D representation of an environment enhances the realism that is experienced by the viewer.

In practice, there are two techniques to arrive at a 3D image. In TV and movie industries, a 3D camera is used to capture a 3D image, or a sequence of 3D images (to create 3D video). The advantage of such capturing of 3D images via a camera is the high degree of similarity with the real situation. A drawback of such capturing of 3D images is that the final viewpoint for the user is (at least largely) determined by the position of the camera. In this context, it is noted that some viewpoint freedom is available, which is based on interpolation or extrapolation of captured images, however this freedom is limited.

In animation and gaming industries, an environment and objects are digitally created by 3D models (for example via polygon meshes). Based on these models, a 3D image is generated. The advantage of generating a 3D image based on digital 3D models is that any viewpoint can be chosen. Indeed in gaming, a viewer is often able to choose from different viewpoints, increasing the viewers freedom. A drawback is that model creation is time-consuming As a result, models for 3D representation are only used to create fictional situations such as animation movies or games.

It is an object of the present invention to provide a mechanism allowing capturing a scene using a 3D image capturing device, and where the scene is representable from a substantially free viewpoint.

SUMMARY

To this end, the invention provides in a method for capturing a scene, using a 3D image capturing device, the method comprising, at a first moment of time, the steps of:
  capturing a first image of said scene via the 3D image capturing device, wherein the first image comprises an array of pixels each having color intensity values and each having a depth value;
  generating, based on the first image, a 3D model comprising multiple segments, such that the 3D model represents the scene at the first moment of time;
wherein the method further comprises, at a second moment of time subsequent to said first moment of time:
  capturing a second image of said scene via the 3D image capturing devices, wherein the second image comprises an array of pixels each having color intensity values and each having a depth value;
  tracking the multiple model segments by calculating movement vectors for each of the elements; and
  updating the 3D model based on the second image.

The method of the invention provides in an efficient way for creating 3D models (for example in the form of digital meshes) based on captured images. According to the method of the invention, information captured by a 3D camera is used in a new way to generate the 3D model. Thereby, an element of the invention is not to discard information from 3D models that are created over time, but to update the 3D models based on information in more recently captured images. This process is executed by tracking model segments and calculating movement vectors for each of the segments of the model. In this manner, the model segments (calculated from previous images) can be re-used and updated (their locations and their color/texture/ . . . can be updated). This mechanism allows to keep information in the 3D model that falls out of the view of a second image. For example considering a rotating object, part of the object will rotate out of the view. This can be recognized by calculating movement vectors for the model segments. The part of the object that rotates out of the view will not be discarded from the 3D model, but will form part of the 3D model that is not visible from the viewpoint of the camera. In free viewpoint configurations, the method of the invention allows to generate correct views from viewpoints even when these viewpoints containing parts that are not visible on any camera (but which were visible by the camera in previous time-frames). Thereby free-viewpoint generation is significantly improved. The method of the invention thereby allows capturing an environment using a 3D image capturing device, and where the environment is representable from a substantially free viewpoint.

Preferably the scene comprises an environment with at least one object, and wherein the step of generating the 3D model comprises:
  filtering the first image for determining outer borders of the environment;
  generating a digital environment in the form of a 3D model representing the outer borders;
  filtering the first image for determining the at least one object;
  generating at least one digital object in the form of at least one further 3D model representing the at least one object;
  positioning the at least one digital object in the digital environment such that the 3D model and at least one further 3D model form said 3D model representing the scene.

In 3D model building, separating so-called background objects from so-called foreground objects significantly simplifies the processing of the model. In a 3D image, such separation can be executed using fairly simple algorithms that are known to the skilled person. Thereby, the background defines the outer borders of the environment and is estimated to be substantially static while foreground objects are expected to be dynamic. Having separate 3D models for objects, which are positioned in the environment, simplifies calculation of the movement vectors of the model segments.

Preferably the step of updating the 3D model comprises adapting the 3D model to represent the scene at the second moment of time. Thereby adapting is defined as repositioning the model segments according to the determined movement vectors. As a result of the updating, the 3D model represents the situation as it is on the second moment of time.

Preferably the said step of generating the 3D model comprises completing the model by filling occluded parts of the model based on predetermined completion algorithms. In practice, a 3D model (for example in the form of a polygon mesh) of an object in the environment is expected to have a volume. As a result, when observing the object via one camera, there is a visible side and an occluded side at the object. According to the invention, when generating the 3D model, the occluded side is also generated based on predetermined algorithms so that the object has a volume.

Preferably the step of tracking the multiple model segments comprises determining that at least one of the multiple model segments is occluded in the second image, and wherein the step of updating the model comprises keeping the at least one of the multiple model segments in the 3D model as occluded parts of the mesh. In this manner, no information is deleted from the model. This enables, as is explained above, free-viewpoint generation much more freely. Information that is occluded, remains part of the model, so that free viewpoint generation is enabled even for those parts that are occluded in the captured images.

Preferably each model segment comprises an accuracy value being an indicator of the degree of certainty of parameters defining the model segment. The accuracy value significantly simplifies the updating of the model. Based on the accuracy value, new information can be added to the model segments to which a low accuracy value is assigned, while model segments to which high accuracy values are assigned are matched to corresponding parts of the image, or are deemed to have fallen out of sight.

Preferably, the degree of certainty is determined based on predetermined intensity values tolerances and predetermined depth value tolerances of the 3D image capturing devices. Every device comes in practice with technical specifications. For image capturing devices, these technical specifications comprise tolerances on accuracy of depth and of intensity values for the captured images. Taking these tolerances (which are predetermined in the technical specifications of the device) into account allows to assign a meaningful degree of certainty to the parameters defining the model (these parameters are determined based on the intensity and depth values captured by the device).

Preferably the 3D image capturing device is a time-of-flight camera. Time-of-flight cameras are 3D image capturing devices that provide a reliable depth value for each of the pixels. Furthermore, each pixel comprises color intensity values (for example RGB values).

Preferably the 3D model is generated in multiple stages, wherein the number of segments forming the 3D model increases over the multiple stages. A 3D model, for example in the form of a polygon mesh, is a digital collection of vertices, edges and faces that correspond to the scene/object representation for specific geometry positions. These vertices/edges/faces are defined as the segments of the model. The number of segments is proportional to the degree of detail of representation. The invention proposes to start with a (preferably predetermined) limited number of elements in a first stage. In further stages, the models are updated by adding segments thereby making the model more complex (and consequently more detailed). Thereby, the multiple stages correspond to multiple moments in time. Over multiple moments in time, more visual information becomes available for building the models. Using this more information increases the certainty, and can be used to increase model detail.

The invention further relates to a computer device or other hardware device programmed to perform the steps of the method of the invention.

The invention further relates to a data storage device encoding a program in machine-readable and machine-executable form to perform the steps of the method of the invention.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

Free Viewpoint Generation in the context of MultiView data captures (with optionally multiview depth data) is a challenging task that requires solving occlusions and interpolate or extrapolate data in order to synthesize a new virtual view on the basis of the available ones. In the prior art, there are mainly two types of approaches for solving this problem.

The first prior art technique belongs to the category of Image Based Rendering (IBR) techniques. The free viewpoint view is generated by processing pixels of the available views (first a view morphing and then occlusion solving). The occlusion handling is difficult because there is no 3D scene geometry available during this process, and missing pixels are synthesized by inpainting from most probable neighboring pixel information. The so-formed viewpoints are usually constrained to the multiple camera positions line/curve with small or large baseline interpolations.

The second prior art technique belongs to the 3D reconstruction algorithms also known as Geometry-Based Rendering. In this approach, a 3D model of the scene is reconstructed from the available captured views. Generating a new synthesized view is then done by simple geometry rendering. Novel viewpoints suffer no constraint as long as available viewable information is available. There are several types of scene geometric representations:

Point based: point clouds

Surface based: 3D meshes, surface lightfields, implicit surfaces

Volume-based: voxels, octrees, plenoptic representations.

In the further description, for simplicity purposes, most examples are explained with 3D meshes (being polygon meshes). It will however be clear that point clouds, surface lightfields, implicit surfaces, voxels, octrees and plenoptic representations are technically equivalent. Particularly, 3D models can be built in any of these representations, and one representation can be transformed into another of these representations without undue burden for the skilled person. Therefore the present invention is not limited to the example of polygon meshes.

Although geometric representations are way more flexible than IBR in terms of number of output synthesized views, these representations suffer from 3D reconstruction errors as a result of noise (most often occurring in the depth sensors), errors in camera calibration, view texture or depth resolution etc. As a result, the rendering quality is usually not as good as in the case of IBR.

In order to provide more synthesized viewpints than IBR techniques, while coping with the 3D reconstruction errors, probabilistic approaches have been proposed in the literature so as to account for these errors for volumetric approaches. This is done by creating occupancy grids or occupancy octrees, which assign to volume space elements (voxels, grid elements or leaves of octrees) flags such as "occupied", "empty" and "unknown", or probabilities of occupancy, based on available observations [1, 3, 4, 5, 6, 7, 8], or similarly by so-called "bundle-adjustment" techniques. This has been explored in robotic navigation and constrained indoors motion flow capture applications.

These solutions are not satisfactory because in case of volumetric approaches, the sampling of the captured 3D scene is suboptimal, generating too much data. Moreover, no distinction is accounted in the volume for respectively static or dynamic portions of the 3D scene. However, probabilistic approaches deeply depend on the dynamicity of the local geometry in order to improve the local signal to noise ratio (SNR), since static geometry positions can be observed several times over time and therefore allow for statistical filtering. Existing so-called probabilistic surface-based approaches targeting motion flow use a probabilistic occupancy grid or octree before the surface and motion extraction and use the same approach as the already mentioned volumetric approaches.

Besides probabilistic approaches, specific tree implementations such as general R-trees, or union of balls or alpha shapes, dynamic implicit surfaces are other representations that were designed for coping with the sampling issue of a 3D scene but not explicitly with the probabilistic nature of the position and shape of the surface due to input capture sensors. It follows that no representation from the prior art targets both sampling efficiency and a probabilistic framework.

An embodiment of the present invention focusses on the processing of so-called 4D scene representation. This representation of a 4D scene (3D plus time) comprises a polygon mesh typically built as a union of a set of globally static geometry objects (such as background planes) and scene object trees for dynamic geometry objects of the scene respectively (also named Background Model and Foreground Model respectively).

Multiple free-viewpoint cases can be distinguished:
1) the interpolation, the new viewpoint lies in between two capturing cameras,
2) the extrapolation, the new viewpoint does not lie between capturing cameras but lies on the same plane and captures the same background area;
3) the total free view, the new viewpoint is freely placed in the scene possibly between the foreground and the background, looking towards the foreground.

Each of these free-viewpoint cases requires different levels of processing for reducing uncertainties or for achieving an acceptable result. The third case (total free view) requires a-priori models or assumptions that are explained hereunder.

The advantages of 4D scene representation as suggested in an embodiment of the invention, both for what concerns construction and use, for free viewpoint are:
  A reliable multi-scale geometry construction that enables to reduce uncertainty by using observations over time and space;
  An efficient sampling of the 3D/4D scene;
  A probabilistic framework for novel view synthesis (beyond free-viewpoint video synthesis) by geometry rendering and image processing, which enables to only process the regions that pose occlusion issues (temporal caching of the background and static parts of the foreground);
  A representation that enables random access to a portion of the 3D/4D scene, that is, significant memory and processing power is saved by only processing what is needed for generating the desired views.

A system according to an embodiment of the invention allows a user to select the viewpoint he desires in order to watch a 4D scene (that is a video of a 3D scene). This 4D scene is preferably captured by multiple cameras providing texture and depth information from different viewpoints (referred to as multi-view video scene). The user interactions are translated into the intrinsic and extrinsic parameters of a virtual camera that captures the scene in the angle and zoom desired by the user. This viewpoint interaction can be provided interactively in real-time, or for every n frames, or in a post-production context.

When the 4D scene is used to generate a predetermined (requested) view from a predetermined virtual view position, at a time t, a classification of the 4D scene representation is performed based on the "visual cone", which is the portion of the 3D scene that is seen from the virtual view position. The nodes of the scene object tree (or the elements in the polygon mesh) of the representation are actually classified into three categories:
  in-view (the node position probability function (PPF) is totally included in the cone),
  intersected (the node PPF is intersected by the cone) and
  out-of-view (the node PPF is not intersected by the visual cone).

The evaluation of the inclusion or intersection of the PPF and the visual cone can be done analytically or by using the expected outer surface (EOS) of the node or by its bounding box.

For rendering the requested view, these three classes of nodes will be processed differently.

In the subsequent step, the scene representation is refined based on the previous frames already visualized.

The parameters of the background planes that are classified as "in-view" or "intersected" of the representation are filtered temporally so as to cope with input sensor, the possibly occluded parts of these planes at this time t in the 4D scene might be visible in the past frames and are concealed accordingly. For the scene object tree nodes:
  the PPFs and flow vectors of the in-view nodes are updated based on previous temporal observations;
  the PPFs and flow vectors of the intersected nodes are updated based on previous temporal observations but their EOS are not generated; and
  the out-of-view nodes are not processed unless they are pointed by in-view nodes. In that case, they are processed as intersected nodes.

In the following step, expected outer surfaces of the in-view nodes are assessed based on temporal observations. This can be done by a statistical analysis of corresponding node's PPFs which are modeled as a Markov Random Chain (the probabilistic flow vectors are the transitions between the nodes of the Markov Chain which are the in-view nodes).

For each in-view node, the confidence measure of the parent node (if this parent node is also in-view) expected outer surface at a higher scale is compared to the one of the current node. In case the parent node confidence measure is higher, the parent node is flagged as to-be-rendered.

Intersected and out-of-view nodes are not processed.

Multi-view texture mapping is performed on the selected expected bounding surfaces (as lightfield surfaces) as well as on the selected background planes. The remaining issue in this step is that for some parts of the bounding surfaces, texture information might be missing due to occlusions or lack of input data. In this case, a model for each in-view node is built backwards to the first frame (by following node to node correspondences given by the probability flow vectors) in order to detect possible data that could help extrapolate this information. In case no information can be re-used, assumptions such as shape texture symmetry can be used in order to help the inpainting of the texture-missing areas.

The view rendering will be realized for the produced surface lightfields by detecting which is the best texture that is the most closely oriented with the requested virtual view.

A second embodiment of the invention is similar to the first embodiment but with caching facilities for the adaptive refinement and the expected bounding surfaces generation. The caching is intended to serve real-time interactivity purposes where the visual cone defined by the desired viewpoint is extended with a confidence volume so as to allow to compensate for rapid (but limited in position drift) changes of viewpoint. In this case, extra computations are done as more parts of the scene object tree and the background planes are flagged as intersected. The caching stores the constructed extra information so that transitions in viewpoint can be quickly compensated. More, it enables the user to pause the content and smoothly slide the viewpoint without extra computation needed for the refinement and surface extraction steps.

According to a further embodiment of the invention, accuracy values on parameters of the representation are represented by a probability density function that can be e.g., for a position parameter, a 3D Gaussian function with 3D mean position and 3D standard deviations (possibly not isotropic), and for a scalar value a 1D Gaussian with mean and standard deviation.

According to another embodiment, a probability density function is added to the elements in the view, but the multiview scene is previously analyzed by a semantic scene classifier. Semantic flags associated to geometry portions such that portions of the background planes or nodes of the scene object tree, are assigned to them as a supplemental parameter together with their uncertainty (or accuracy) measures. For example, if a portion of a background plane is identified with 80% certainty as being "sky" and 20% being "water", both flags will be associated to this background plane portion together with their respective uncertainty measure.

The invention enables a far more efficient post-production and better interactive viewing experiences for natural content thanks to its probabilistic approach.

The advantage is to be able to better force a temporal consistency to the scene reconstruction as well as being adapted to the growing media that is lightfield video (each point of the scene has multiple light rays in different directions so as to enable refocus and viewing angle interactivity). The second key advantage is the highly adaptive scene sampling strategy that avoids restrictive regular sampling via voxel grids and octrees (that are also trees but that have a fixed maximum number of children for each node).

Figure 1A:
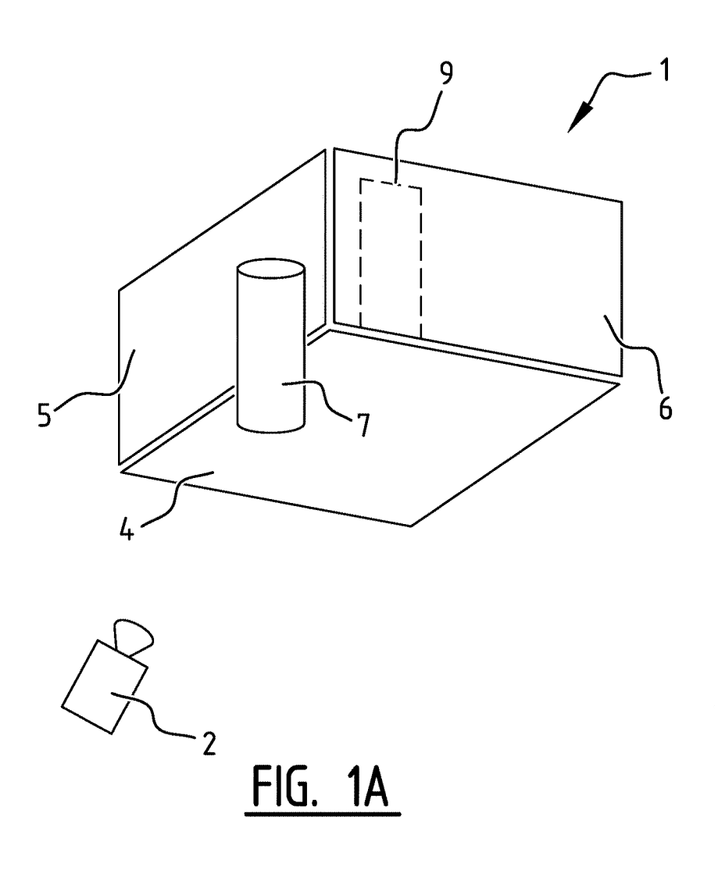
FIG. 1 illustrates an environment comprising an object, captured at two moments of time.
Figure 1B:
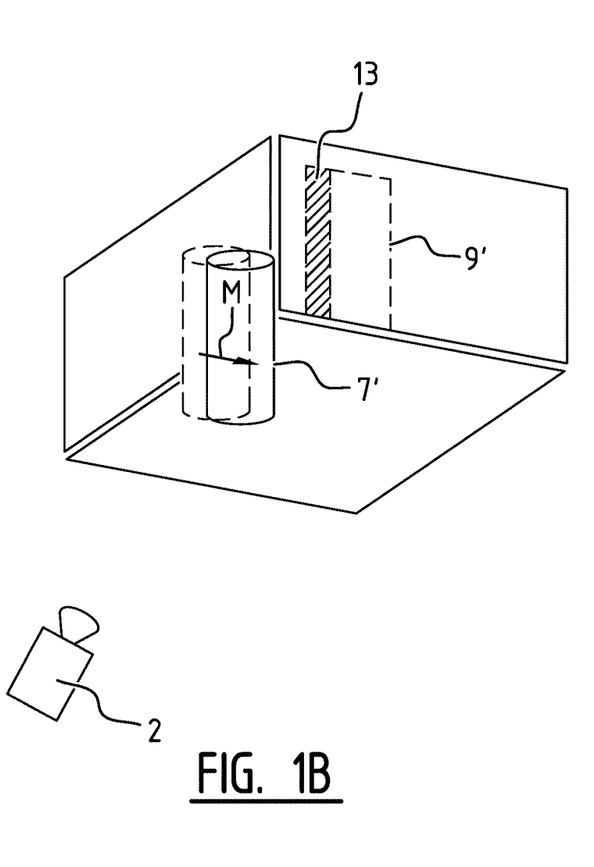

FIG. 1 shows an environment 1 with at least one object 7. FIG. 1 furthermore shows a 3D image capturing device 2. The FIG. 1 comprises two parts, a part A representing the environment and the object at a first moment of time T1, and a second part B representing the same environment and the same object 7 at a second moment of time T2. Thereby, the environment is typically static while the objects are dynamic. The object is therefore moved in part B of FIG. 1 compared to part A. The environment 1 of the example is a room wherein one object (being a cylindrical object 7) is located. Thereby, for explanation and clarity purposes, the ceiling of the room is not shown.

The environment of FIG. 1 is captured according to the following method. A first image is captured using the camera 2. This captured image comprises an array of pixels, wherein each pixel typically comprises color intensity values (for example RGB values) and a depth value (since it is a 3D camera, the camera is adapted to measure a distance between the camera and the captured pixels). This image shows the environment 1 with the objects 7 from a first view point, as a result of which some parts of the environment and objects are visible, and other parts of the environment and objects are occluded (as will be clear from the following description).

The captured first image is filtered to determine outer borders of the environment. In the present case, the ground surface 4 forms an outer border of the environment 1, and the environment 1 of the example further comprises a first wall 5 and a second wall 6 forming outer borders of the environment. Thereby, outer border of the environment 1 is defined as those parts of the environment beyond which no further elements can be seen in the image. Thereby, it will be clear that when looking at a room, a ground surface, a ceiling surface and one or more wall surfaces will generally form the outer borders of the environment. When for example looking at a football stadium, the environment will show a ground surface (formed by the grass), wall surfaces that extend upward with a limited height (formed by the stand of the football stadium), and the environment will not show a ceiling (since the football stadium is, at least in this example, open at the top). According to another example, where a landscape forms the environment, the outer borders of the environment only comprise a ground surface (since in an open landscape no walls are present). From the image of the camera 2, these outer borders are deduced. The skilled person will recognize that there are different approaches for extracting outer borders from a 3D image. Since the type of extraction is not essential for the invention, the skilled person can use any extraction mechanism. These extraction mechanisms are therefore not described in this description.

Based on the determined outer borders of the environment, which in the example of FIG. 1 are formed by a ground surface 4, a first wall surface 5 and a second wall surface 6, a digital environment is generated. This digital environment is generated in the form of a 3D model, wherein the outer borders are represented. This 3D model comprises all available information of the outer borders that can be deduced from the first image. This means that not only the position of the outer borders 4, 5, 6 is generated into a 3D model, but that the outer border elements 4, 5, 6 are also colored based on the color intensity values of the outer borders, available from the first image. Thereby, it will be clear from the example of FIG. 1, that some parts will be occluded. In the example of FIG. 1, object 7 occludes a first part 9 of the outer border. Thus, when the digital environment is generated based on the image of camera 2, this first part 9 cannot be seen, and consequently no color information and texture information is available for this part. To enhance the method for capturing an environment, the invention proposes to segment the digital model and provide the segments with an accuracy value. In the example of FIG. 1, the environment can be segmented and provided with an accuracy value so that the first wall 5 has a relatively high accuracy value (since it is not occluded for the camera 2). At least the first part 9 of the second wall 6 is provided with a low accuracy value, since the information of this part can only be assumed based on neighborhood information. This shows that in generating digital environment, the part 9 can be filled in, for example colored, based on neighborhood information. Thereby, since a low accuracy value is assigned to this part 9, this information will not be considered as 'true' or 'accurate' in the further processing of the digital model.

The first image (captured by the first camera 2) is further filtered for determining the objects. For each of these objects (in this case only one object 7) a 3D model is generated, for example in the form of a 3D mesh (polygon mesh). The so-generated 3D models are then positioned within the generated 3D environment to thereby recreate the environment with the objects 1 in a digital manner.

A second image is captured using the 3D camera 2 at a second moment of time T2 that succeeds the first moment of time T1. This is illustrated in FIG. 1B. Thereby, the first image and second image are preferably captured by the same camera which is located at substantially the same position with respect to the environment. The second image thereby shows the same environment and the same objects, but at a different moment of time. The second image shows, analogue to the first image, an array of pixels, wherein each pixel comprises at least one color intensity value and a depth value. Segments of the 3D model with low accuracy values are selected. In the example of FIG. 1 the part 9 of the outer borders of the environment 1 is selected. From the second image, sections of the array of pixels are filtered that correspond to the selected first part 9. Thereby, information from the second image is used to create/refine the selected parts (in this case being the part 9) of the digital model. In the example of FIG. 1, part 9', which is occluded in the second image by the object 7', is at least partially different from the part 9, since the object has moved M. As a result, color information and texture information from the second image can be used to improve the digital model that is created based on the first image. In the example of FIG. 1, object 7' still occludes a subpart of the first part 9. Particularly, object 7' occludes the segment that is indicated with reference number 9'. Since occluded part 9 falls together with occluded segment 9', a portion 13 of the model is occluded in the two images. Therefore, this portion 13 cannot be seen in any of the images, and information in the 3D model will have a low accuracy, even after the update with information from the second image.

Since the 3D model comprises accuracy values, multiple images can be processed in an efficient manner. Particularly, as described above, when a second image is captured only those parts of the second image that relate to segments or parts in the model that have a low accuracy, should be processed. This significantly improves the 3D model creation.

Figure 2A:
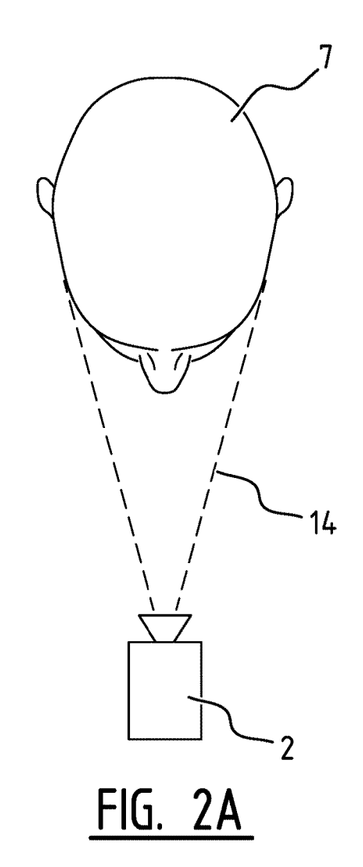
FIG. 2 illustrates an object, captured at two moments of time.
Figure 2B:
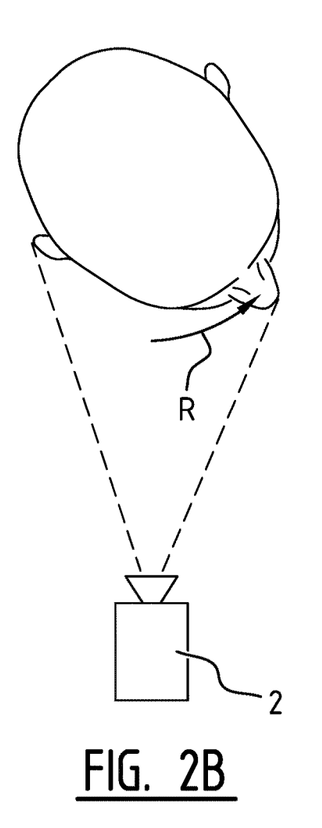

FIG. 2 shows the effect of multiple captures over time (part A illustrates an object at moment of time T1 while part B illustrates the same object at moment of time T2) of an object 7. The figure shows how the first camera 2 captures a first view 14 of the object 7. After capturing the first object at the first moment of time T1, shown in FIG. 2A, the lateral sides and the backside of the object (from the viewpoint of the first camera 2), are not visible and thus no information is available for these parts. These parts of the object are therefore created with an estimated shape and color, and a low accuracy is assigned to these parts. The second image at time T2 (FIG. 2B) is then used to complete the 3D model, at least for the part that can be seen in the second image. In the example of FIG. 2B, the object is rotated R between time T1 and T2. Therefore a lateral side of the object 7 becomes visible in the second image. Information can therefore be added to the 3D model based on the second image for what concerns this lateral side. This explanation based on the example shown in FIGS. 1 and 2, shows how a 3D model can be updated using information from images showing other viewpoints. Thereby, the accuracy value is used for optimizing the processing of the 3D model creation. Particularly, further images are only processed for those parts that correspond to a segment of the 3D model having low accuracy values.

To be able to update the 3D model of the objects using information of the second (or subsequent) image, the position and orientation of the objects are tracked. This means that the first image (captured at time T1) and second image (captured at time T2) are compared to find corresponding model segments. The position and orientation of these segments is compared to define a movement vector M and a rotation vector R. Thereby, the combination of movement vector M and rotation vector R defines how the position and orientation of the object has changed. The same movement vector M and rotation vector R is then applied to the 3D model of the object. After applying these vectors M and R to the 3D model, some segments of the model with low accuracy value become visible by in the viewpoint of the camera 2. These segments can then be updated.

Figure 3:
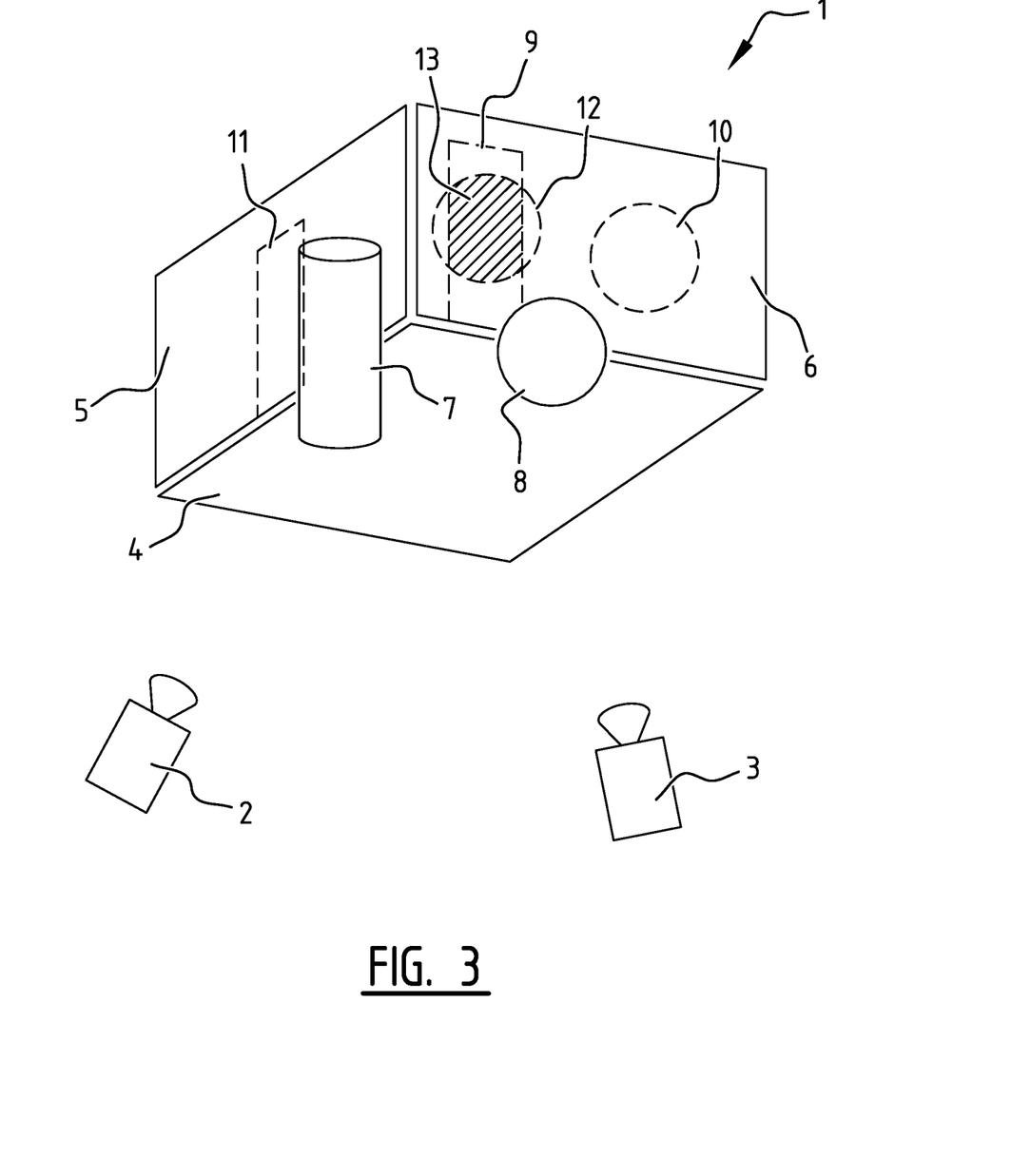
FIG. 3 illustrates an environment comprising two objects, captured with two cameras.
Figure 4:
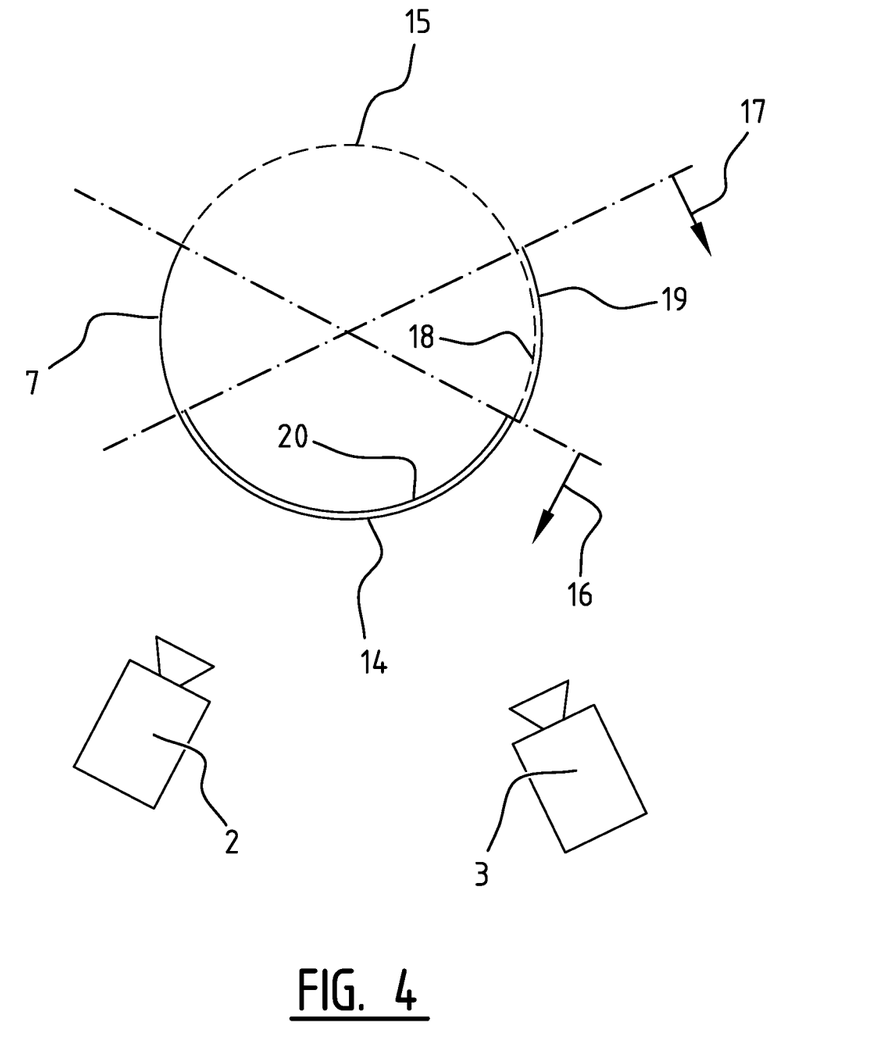
FIG. 4 illustrates an object captured with two cameras.

In the embodiment wherein multiple image capturing devices are used (as shown in FIGS. 3 and 4), the above techniques (using tracking of object over time) can be combined with following additional features to further improve free-viewpoint generation. FIG. 3 shows an environment 1 with at least one object (analogue to FIG. 1). FIG. 3 furthermore shows a first 3D image capturing device 2, and a second 3D image capturing device 3. The 3D image capturing devices are in the further description referred to as cameras 2, 3 or as 3D cameras. The cameras 2, 3 are located at different viewpoints with respect to the environment 1. The environment 1 of the example is a room wherein two objects (being a cylindrical object 7 and ball 8) are located. Thereby, for explanation and clarity purposes, the ceiling of the room is not shown.

The environment of FIG. 3 is captured according to the following method. A first image is captured using the camera 2. This captured image comprises an array of pixels, wherein each pixel typically comprises color intensity values (for example RGB values) and a depth value (since it is a 3D camera, the camera is adapted to measure a distance between the camera and the captured pixels). This image shows the environment 1 with the objects 7, 8 from a first view point, as a result of which some parts of the environment and objects are visible, and other parts of the environment and objects are occluded (as will be clear from the following description).

The captured first image is filtered to determine outer borders of the environment in the same manner as described above in relation to FIG. 1. Based on the determined outer borders of the environment, a digital environment is generated. Thereby, it will be clear from the example of FIG. 3, that some parts will be occluded. In the example of FIG. 3, object 7 occludes a first part 9 of the outer border. Furthermore, object 8 occludes a second part 10 of the outer border. Thus, when the digital environment is generated based on the image of camera 2, this first part 9 and second part 10 cannot be seen, and consequently no color information and texture information is available for these parts. To enhance the method for capturing an environment, the invention proposes to segment the digital model and provide the segments with an accuracy value. In the example of FIG. 3, the environment can be segmented and provided with an accuracy value so that the first wall 5 has a relatively high accuracy value (since it is not occluded for the camera 2). At least the first part 9 and the second part 10 of the second wall 6 are provided with a low accuracy value, since the information of these parts can only be assumed based on their neighborhoods. This shows that in generating digital environment, the parts 9 and 10 can be filled in, for example colored, based on neighborhood information. Thereby, since a low accuracy value is assigned to these parts 9, 10, this information will not be considered as 'true' or 'accurate' in the further processing of the digital model.

The first image (captured by the first camera 2) is further filtered for determining the objects 7, 8. For each of these objects 7, 8 a 3D model is generated, for example in the form of a 3D mesh (polygon mesh). The so-generated 3D models are then positioned within the generated 3D environment to thereby recreate the environment with the objects 1 in a digital manner.

A second image is captured using the second 3D camera 3. Thereby, according to the additional features of FIGS. 3 and 4, the first image and second image are preferably captured at the same moment of time, or at least at substantially the same moment of time. The second image thereby shows the same environment and the same objects, but from a different viewpoint. The second image shows, analogue to the first image, an array of pixels, wherein each pixel comprises at least one color intensity value and a depth value. Preferably, the position of the first camera 2 and the second camera 3 with respect to the environment 1 is fixed and known in advance. Segments of the 3D model with low accuracy values are selected. In the example of FIG. 3 the parts 9 and 10 of the outer borders of the environment 1 are selected. From the second image, sections of the array of pixels are filtered that correspond to the selected first part 9 and the second part 10. Thereby, information from the second image is used to create/refine those parts 9, 10 of the digital model. In the example of FIG. 3, part 10 can be seen by the second camera 3. As a result, color information and texture information from the second image can be used to improve the digital model that is created based on the first image. Thereby, since the information in the updated part 10 of the 3D model is based on the second image, the accuracy value of this part 10 is increased after the update. Regarding part 9, in the example of FIG. 3, object 8 still occludes a subpart of the first part 9. Particularly, object 8 occludes the segment that is indicated with reference number 12. Object 7 occludes segment 11. Segment 11 is situated on the first wall 5. Since the first wall 5 was already completely visible in the first image, in the 3D model, the information (such as color information) regarding this segment 11 is known although it is not visible in the second image. Since occluded part 9 falls together with occluded segment 12, a portion 13 of the model is occluded in the two images. Therefore, this portion 13 cannot be seen in any of the images, and information in the 3D model will have a low accuracy, even after the update with information from the second image.

FIG. 4 shows the effect of multiple viewpoints on an object 7. The figure shows how a first camera 2 captures a first view 14 of the object 7. After capturing the first object, the backside of the object (from the viewpoint of the first camera 2), being the parts 15, 18, are not visible and thus no information is available for these parts, 15, 18. These parts of the object are therefore created with an estimated shape and color, and a low accuracy is assigned to these parts. The second image from the second camera 3 is then used to complete the 3D model, at least for the part that can be seen in the second image. In the example of FIG. 4, the second image shows the segments 20 and 19 of the object 7. Segment 20 corresponds to part of the segment 14 that was already retrieved from the first image. Segment 19 was not visible in the first image, and information can therefore be added to the 3D model based on the second image for what concerns this second segment 19. This explanation based on the example shown in FIGS. 3 and 4, shows how a 3D model can be updated using information from images showing other viewpoints. Thereby, the accuracy value is used for optimizing the processing of the 3D model creation. Particularly, further images are only processed for those parts that correspond to a segment of the 3D model having low accuracy values.

In an embodiment of the invention, it is proposed to take into account uncertainty in the representation of the dynamic 3D scene (that can also be referred to as "4D scene" when taking into account the 3 spatial dimensions as well as the temporal dimension) itself with a multi-scale probabilistic surface approach. The 4D scene is represented as a set of globally static (background) and dynamic (foreground) geometry objects respectively, and for each of these objects, their position probability function (noted PPF, which is a 3D function with local support that determines for some positions in the scene space with which probability the object is positioned there) is also represented per temporal frame. Static portions of geometry are preferably represented by sets of surfaces (such as planes, quadrics etc.) and represent the background of the scene. Each surface or plane is described by one or a combination of its position, width, height and normal vector, multiple texture coordinates for specific viewing angles (as in a surface lightfield), all being subject to specific error bounds (also defined as tolerances) that depend on the multiview plus depth capture configuration. Dynamic portions of the scene geometry, that can also be seen as foreground objects, are described by a tree of multiscale three-dimensional functions with local support referred to as PPF. These functions, that can be e.g. spheres, represent the probability density of captured points positions observed at a given scale for a specific space portion. Outer surfaces are extracted from these PPF by either using a bounding surface (in case only one frame is available) or a expected outer surface (that is a bounding surface which is constructed by a temporal analysis of the function during time in order to reduce its uncertainty; therefore called "expected" outer surface).

Likewise the planes, the (expected) outer surfaces (hereafter referred to as EOS) receive multiple texture (also defined as color pattern) coordinates along viewing angles defined by the multiview capture with corresponding error bounds. Optionally the scene geometry elements can also receive a probabilistic semantic description; that is, a set of semantic tags associated with a probability value that measures the uncertainty about the semantic value of this scene geometry portion.

As a summary, the representation uses a background and at least one foreground model. The background model is typically composed of surface lightfields with probabilistic parameters that can be refined over time. The foreground model is composed of a probabilistic multiscale tree of objects that can have a semantic interpretation. For each node of the tree, a PPF is determined to keep track of uncertainties and allow to refine these over time, while EOS are the result of this refinement and are used for visualization as surface lightfields.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for capturing a scene, using a 3D image capturing device, the method comprising, at a first moment of time:
    capturing a first image of said scene via the 3D image capturing device, wherein the first image comprises an array of pixels each having color intensity values and each having a depth value;
    generating, based on the first image, a 3D model comprising multiple segments, such that the 3D model represents the scene at the first moment of time;
    wherein the method further comprises, at a second moment of time subsequent to said first moment of time:
    capturing a second image of said scene via the 3D image capturing device, wherein the second image comprises an array of pixels each having color intensity values and each having a depth value;
    tracking the multiple model segments by calculating movement vectors for each of the segments, wherein the tracking the multiple model segments comprises determining that at least one of the multiple model segments is occluded in the second image, and wherein the updating the 3D model comprises keeping the at least one of the multiple segments in the 3D model as occluded part of the model; and
    updating the 3D model based on the second image.

2. The method according to claim 1, wherein the scene comprises an environment with at least one object, and wherein the generating the 3D model comprises:
    filtering the first image for determining outer borders of the environment;
    generating a digital environment in the form of a 3D model representing the outer borders;
    filtering the first image for determining the at least one object;
    generating at least one digital object in the form of at least one further 3D model representing the at least one object;
    positioning the at least one digital object in the digital environment such that the 3D model and at least one further 3D model form said 3D model representing the scene.

3. The method according to claim 1, wherein the updating the 3D model comprises adapting the 3D model to represent the scene at the second moment of time.

4. The method according to claim 1, wherein the generating the 3D model comprises completing the model by filling occluded parts of the model using at least one completion algorithms.

5. The method according to claim 1, wherein each model segment comprises an accuracy value being an indicator of a degree of certainty of parameters defining the model segment.

6. The method according to claim 5, wherein the degree of certainty is determined based on a predetermined uncertainty of intensity measurements and a predetermined uncertainty of depth value measurements of the 3D image capturing device.

7. The method according to claim 1, wherein the 3D model is generated in multiple stages, wherein the number of segments forming the 3D model increases over the multiple stages.

8. The method according to claim 7, wherein the multiple stages correspond to multiple moments in time.

9. A system comprising a 3D image capturing device operationally connected to a processor programmed to perform the method of claim 1.

10. The system according to claim 9, wherein the 3D image capturing device is configured to be located with respect to an environment comprising at least one object at a viewpoint, and wherein the processor is configured to filter a first image for determining outer borders of the environment.

11. The system of claim 10, further comprising a memory adapted for storing a 3D model comprising 3D model segments, wherein the memory is further adapted for storing an accuracy value for each of the 3D model segments.

12. The system of claim 11, wherein the processor is further configured to calculate movement vectors for each of the 3D model segments.

13. A non-transitory data storage device encoding a program in machine-readable and machine-executable form to perform the method of claim 1.

14. A system for capturing a scene, using a 3D image capturing device, the system comprising:
   at least one processor; and
   at least one memory device including computer program code, the at least one memory device and the computer program code configured to, with the at least one processor, cause the system to at least perform, at a first moment of time:
      capturing a first image of said scene via the 3D image capturing device, wherein the first image comprises an array of pixels each having color intensity values and each having a depth value;
      generating, based on the first image, a 3D model comprising multiple segments, such that the 3D model represents the scene at the first moment of time;
   at a second moment of time subsequent to said first moment of time:
      capturing a second image of said scene via the 3D image capturing device, wherein the second image comprises an array of pixels each having color intensity values and each having a depth value;
      tracking the multiple model segments by calculating movement vectors for each of the segments, wherein each model segment comprises an accuracy value being an indicator of a degree of certainty of parameters defining the model segment and wherein the degree of certainty is determined based on a predetermined uncertainty of intensity measurements and a predetermined uncertainty of depth value measurements of the 3D image capturing device; and
      updating the 3D model based on the second image.

15. The system according to claim 14, wherein the scene comprises an environment with at least one object, and wherein the generating the 3D model comprises:
   filtering the first image for determining outer borders of the environment;
   generating a digital environment in the form of a 3D model representing the outer borders;
   filtering the first image for determining the at least one object;
   generating at least one digital object in the form of at least one further 3D model representing the at least one object;
   positioning the at least one digital object in the digital environment such that the 3D model and at least one further 3D model form said 3D model representing the scene.

16. The system according to claim 14, wherein the 3D model is generated in multiple stages, wherein the number of segments forming the 3D model increases over the multiple stages.

17. The system according to claim 16, wherein the multiple stages correspond to multiple moments in time.

18. A system for capturing a scene, using a 3D image capturing device, the system comprising:
   at least one processor; and
   at least one memory device including computer program code, the at least one memory device and the computer program code configured to, with the at least one processor, cause the system to at least perform, at a first moment of time:
      capturing a first image of said scene via the 3D image capturing device, wherein the first image comprises an array of pixels each having color intensity values and each having a depth value;
      generating, based on the first image, a 3D model comprising multiple segments, such that the 3D model represents the scene at the first moment of time;
   at a second moment of time subsequent to said first moment of time:
      capturing a second image of said scene via the 3D image capturing device, wherein the second image comprises an array of pixels each having color intensity values and each having a depth value;
      tracking the multiple model segments by calculating movement vectors for each of the segments, wherein the tracking the multiple model segments comprises determining that at least one of the multiple model segments is occluded in the second image, and wherein the updating the 3D model comprises keeping the at least one of the multiple segments in the 3D model as occluded part of the model; and
      updating the 3D model based on the second image.

19. The system according to claim 18, wherein the scene comprises an environment with at least one object, and wherein the generating the 3D model comprises:
   filtering the first image for determining outer borders of the environment;
   generating a digital environment in the form of a 3D model representing the outer borders;
   filtering the first image for determining the at least one object;
   generating at least one digital object in the form of at least one further 3D model representing the at least one object;
   positioning the at least one digital object in the digital environment such that the 3D model and at least one further 3D model form said 3D model representing the scene.

20. The system according to claim 18, wherein the 3D model is generated in multiple stages, wherein the number of segments forming the 3D model increases over the multiple stages.

* * * * *